United States Patent
Nam et al.

(10) Patent No.: US 11,221,715 B2
(45) Date of Patent: Jan. 11, 2022

(54) METHOD FOR MEASURING INTENSITY OF TOUCH PRESSURE IN TOUCH INPUT DEVICE, AND TOUCH INPUT DEVICE FOR DETECTING INTENSITY OF TOUCH PRESSURE

(71) Applicant: MELFAS INC.

(72) Inventors: Sung Sik Nam, Seoul (KR); Jin Tae Kim, Gyeonggi-do (KR)

(73) Assignee: MELFAS INC., Seongnam-si (KR)

( * ) Notice: Subject to any disclaimer, the term of this patent is extended or adjusted under 35 U.S.C. 154(b) by 831 days.

(21) Appl. No.: 16/063,136

(22) PCT Filed: Dec. 6, 2016

(86) PCT No.: PCT/KR2016/014226
§ 371 (c)(1),
(2) Date: Jun. 15, 2018

(87) PCT Pub. No.: WO2017/105020
PCT Pub. Date: Jun. 22, 2017

(65) Prior Publication Data
US 2021/0200403 A1 Jul. 1, 2021

(30) Foreign Application Priority Data

Dec. 17, 2015 (KR) .................. 10-2015-0180882

(51) Int. Cl.
*G06F 3/044* (2006.01)
*G06F 3/041* (2006.01)

(52) U.S. Cl.
CPC .......... *G06F 3/0445* (2019.05); *G06F 3/0446* (2019.05); *G06F 3/0447* (2019.05); *G06F 3/04146* (2019.05); *G06F 2203/04105* (2013.01)

(58) Field of Classification Search
CPC .. G06F 3/04146; G06F 3/0445; G06F 3/0446; G06F 3/0447; G06F 2203/04105
See application file for complete search history.

(56) References Cited

U.S. PATENT DOCUMENTS 8,319,740 B2 * 11/2012 Kimura ................ G06F 3/0418
345/173
2012/0026123 A1 * 2/2012 Grunthaner .......... G06F 3/0418
345/174

(Continued)

FOREIGN PATENT DOCUMENTS

JP 2012198607 A 10/2012
JP 2015204098 A 11/2015

(Continued)

*Primary Examiner* — Towfiq Elahi
(74) *Attorney, Agent, or Firm* — Paratus Law Group, PLLC

(57) ABSTRACT

A method for calibrating the intensity of touch input pressure according to an input position in a touch input device. The method includes a step in which the touch input device detects a touch input through a touch panel; a step in which the touch input device determines the position of the touch input on the touch panel; a step in which the touch input device measures a degree of change in capacitance corresponding to the intensity of pressure according to the touch input; and a step in which the touch input device calibrates the intensity of the pressure according to the position of the touch input.

13 Claims, 14 Drawing Sheets

(56) References Cited

U.S. PATENT DOCUMENTS

2015/0193068 A1\* 7/2015 Kim ................. G06F 3/0416
                                                        345/174
2015/0296062 A1\* 10/2015 Lee ................. G06F 3/0447
                                                        455/566

FOREIGN PATENT DOCUMENTS

| KR | 20030022299 A | 3/2003 |
| KR | 20140068257 A | 6/2014 |
| KR | 20140076957 A | 6/2014 |
| KR | 20140131345 A | 11/2014 |

\* cited by examiner

METHOD FOR MEASURING INTENSITY OF TOUCH PRESSURE IN TOUCH INPUT DEVICE, AND TOUCH INPUT DEVICE FOR DETECTING INTENSITY OF TOUCH PRESSURE

CROSS-REFERENCE TO RELATED APPLICATIONS

This application represents the national stage entry of PCT International Application No. PCT/KR2016/014226, filed on Dec. 6, 2016 and claims the benefit of Korean Patent Application No. 10-2015-0180882, filed on Dec. 17, 2015, the contents of which are incorporated by reference in their entirety.

TECHNICAL FIELD

The following description relates to a method of measuring touch pressure intensity.

BACKGROUND ART

In accordance with market expansion of smart phones and other mobile devices, a variety of touch input devices have appeared. In touch input devices, generally, a touch input position and whether a touch input is present are used as input commands. In addition, recently, in touch input devices, touch pressure intensity (intensity of touch) has been used as a new input command.

SUMMARY

Technical Problem

A touch input device that senses touch pressure intensity may, due to a limitation in a mechanical structure, differently sense such pressure intensity depending on a touch position. The following technology addresses a goal of spatially-uniform sensing of touch pressure intensity regardless of a touch position in a touch input device.

A method of measuring touch pressure intensity in a touch input device includes sensing, by the touch input device, touch input through a touch panel, determining, by the touch input device, a position of the touch input on the touch panel, measuring, by the touch input device, a degree of change in capacitance according to the touch input, compensating, by the touch input device, the degree of change in capacitance according to the touch input position, and measuring, by the touch input device, pressure intensity according to the touch input on the basis of the compensated degree of change in capacitance.

A touch input device configured to sense touch pressure intensity includes a first electrode layer which comprises a first electrode, a second electrode layer which comprises a second electrode, a spacer layer located between the first electrode layer and the second electrode layer, and a controller circuit configured to measure an amount of change in capacitance according to a change in distance between the first electrode layer and the second electrode layer and to compensate the amount of change in capacitance according to a touch input position.

According to another embodiment, a touch input device configured to sense touch pressure intensity includes a first electrode layer formed on a first insulating film and configured to include a first electrode which extends in a direction parallel to the first insulating film, a metal layer which is formed of a conductive metal material and extends in a direction parallel to the first electrode layer, a spacer layer located between the first electrode layer and the metal layer, and a controller circuit configured to measure an amount of change in capacitance according to a change in distance between the first electrode layer and the metal layer and to compensate the amount of change in capacitance according to a touch input position.

Advantageous Effects

The following technology provides a user with a uniform touch interface in which, when touch is performed using a pressure having the same intensity, there is no deviation caused by a touch position.

DETAILED DESCRIPTION

Figure 1:
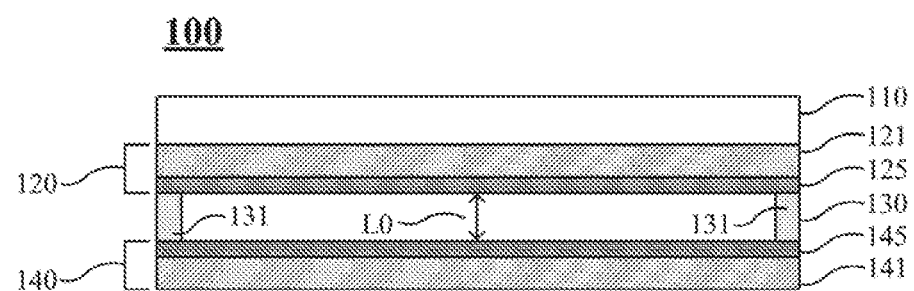
FIG. 1 illustrates an example of a cross-sectional view of a touch input device.

Since a following technology may be variously changed and may have a variety of embodiments, particular embodiments will be illustrated in the drawings and described in detail. However, it should be understood that the following technology is not limited to the particular embodiments and includes all changes and equivalents or substitutes included in the concept and technical scope of the following technology.

Terms such as first, second, A, B, and the like may be used for describing a variety of components but do not limit the components, and are used only for distinguishing one component from another. For example, without departing from the scope of the following technology, a first component may be referred to as a second component, and similarly, a second component may be referred to as a first component. The term "and/or" includes any and all combinations of one or a plurality of associated listed items.

A singular expression of terms used herein should be understood as including a plural expression unless clearly defined otherwise in context. It should be understood that the terms "comprise," and the like are used herein to specify the presence of stated features, numbers, steps, operations, elements, components or combinations thereof but do not preclude the presence or addition of one or more other features, numbers, steps, operations, elements, components, or combinations thereof.

Before a detailed description of the drawings, it is clear that distinguishing between components in the specification is merely distinguishing between each main function performed by each component. That is, two or more components which will be described below may be integrated as one component or one component may be divided into two or more components for each function thereof. Also, each of the components which will be described below may additionally perform part or all of a function of another component in addition to a main function thereof. Here, part of a main function of each component may be performed by another component.

Also, in performing a method or an operation, processes included in the method may be performed in an order different from a stated order unless a particular order is clearly disclosed in context. That is, each of the processes may be performed in the stated order, may be performed substantially at the same time, or may be performed in an opposite order.

A following touch input device is a device capable of evenly sensing touch input intensity (pressure intensity). The following touch input device may include a component configured to determine whether a touch is present or determine a position of a touch like an existing touch input device. The component configured to determine a position of a touch may include an electrode layer (a touch panel) for sensing a touch, a driving circuit configured to apply a signal to the electrode layer, and a controller configured to control the driving circuit. A variety of types of touch panels such as a capacitive type, a resistive film type (pressure-sensitive type), and the like may be used. Capacitive touch panels are generally used in devices such as a smart phone. Most of the capacitive touch panels are projected capacitive (PCAP) touch panels. PCAP touch panels are classified into a self-capacitive touch panel using its own capacitance and a mutual-capacitive touch panel using mutual capacitance. In the following technology, a variety of touch panels may be used. A detailed description of general touch panels will be omitted.

Hereinafter, a method of compensating pressure intensity according to an input position on a touch input device will be described in detail with reference to the drawings. FIG. 1 illustrates an example of a cross-sectional view of a touch input device 100. In FIG. 1, a driving circuit, a control circuit, and the like are not illustrated.

FIG. 1 illustrates an example of basic components of the touch input device 100 for measuring touch pressure intensity. FIG. 1 illustrates only significant components of the touch input device 100 and does not illustrate a display panel. Referring to FIG. 1, the touch input device 100 includes a touch panel 110, a first electrode layer 120, a spacer layer 130, and a second electrode layer 140.

The touch panel 110 senses whether a user inputs a touch and senses a touch input position.

The first electrode layer 120 is located below the touch panel 110. The first electrode layer 120 includes a first insulating film 121 and a first electrode 125. The first insulating film 121 includes an insulating material which does not conduct electric current. The first insulating film 121 may include a transparent thin film of a plastic material such as polyethylene terephthalate (PET). The first electrode 125 may include, for example, one integrally formed electrode. The first electrode 125 may include, as another example, a plurality of electrodes formed in one direction (first direction). The first electrode 125 includes a material which conducts an electric current. The first electrode 125 may include at least one of silver ink, copper, carbon nanotubes (CNTs), and a transparent conductive film (indium tin oxide (ITO)) having a uniform thickness and including tin oxide ($SnO_2$), indium oxide ($In_2O_3$), and the like.

The second electrode layer 140 is located below the first electrode layer 120. The second electrode layer 140 includes a second insulating film 141 and a second electrode 145. The second insulating film 141 includes an insulating material which does not conduct an electric current. The second insulating film 141 may include a transparent thin film of a plastic material such as PET. The second electrode 145 may include, for example, one integrally formed electrode. The second electrode 145 may include, as another example, a plurality of electrodes formed in a direction (a second direction) different from the first direction. The second electrode 145 includes a material which conducts an electric current. The second electrode 145 may include at least one of silver ink, copper, CNTs, and a transparent conductive film (ITO) having a uniform thickness and including $SnO_2$, $In_2O_3$, and the like.

The spacer layer 130 is located between the first electrode layer 120 and the second electrode layer 140. The spacer layer 130 is a component for providing a certain space between the first electrode layer 120 and the second electrode layer 140. The spacer layer 130 may include an inner partition wall 131 which supports the first electrode layer 120 and the second electrode layer 140. The spacer layer 130 may be filled with a dielectric substance. The dielectric substance includes materials such as open cell foam, gel, lightly linked polymer, and the like. For example, the spacer layer 130 may be filled with air.

Significant components for measuring touch pressure intensity are the first electrode layer 120, the spacer layer 130, and the second electrode layer 140. For convenience of description, hereinafter, a panel which includes the first electrode layer 120, the spacer layer 130, and the second electrode layer 140 is referred to as "a touch pressure panel."

An internal configuration of the touch input device may differ from that shown in FIG. 1. For example, the touch the touch panel 110, the first electrode layer 120, and the second electrode layer 140 may be stacked in an order different from a vertical order shown in FIG. 1. Also, a stacking order of the layers which form the touch pressure panel may be different. However, the spacer layer 130 should constantly be located between the first electrode layer 120 and the second electrode layer 140. In addition, the first electrode layer 120 or the second electrode layer 140 may employ an electrode layer included in the touch panel 110. In this case, the touch panel 110, which determines a touch input position, and the touch pressure panel, which determines touch pressure intensity, share some components.

Figure 2:
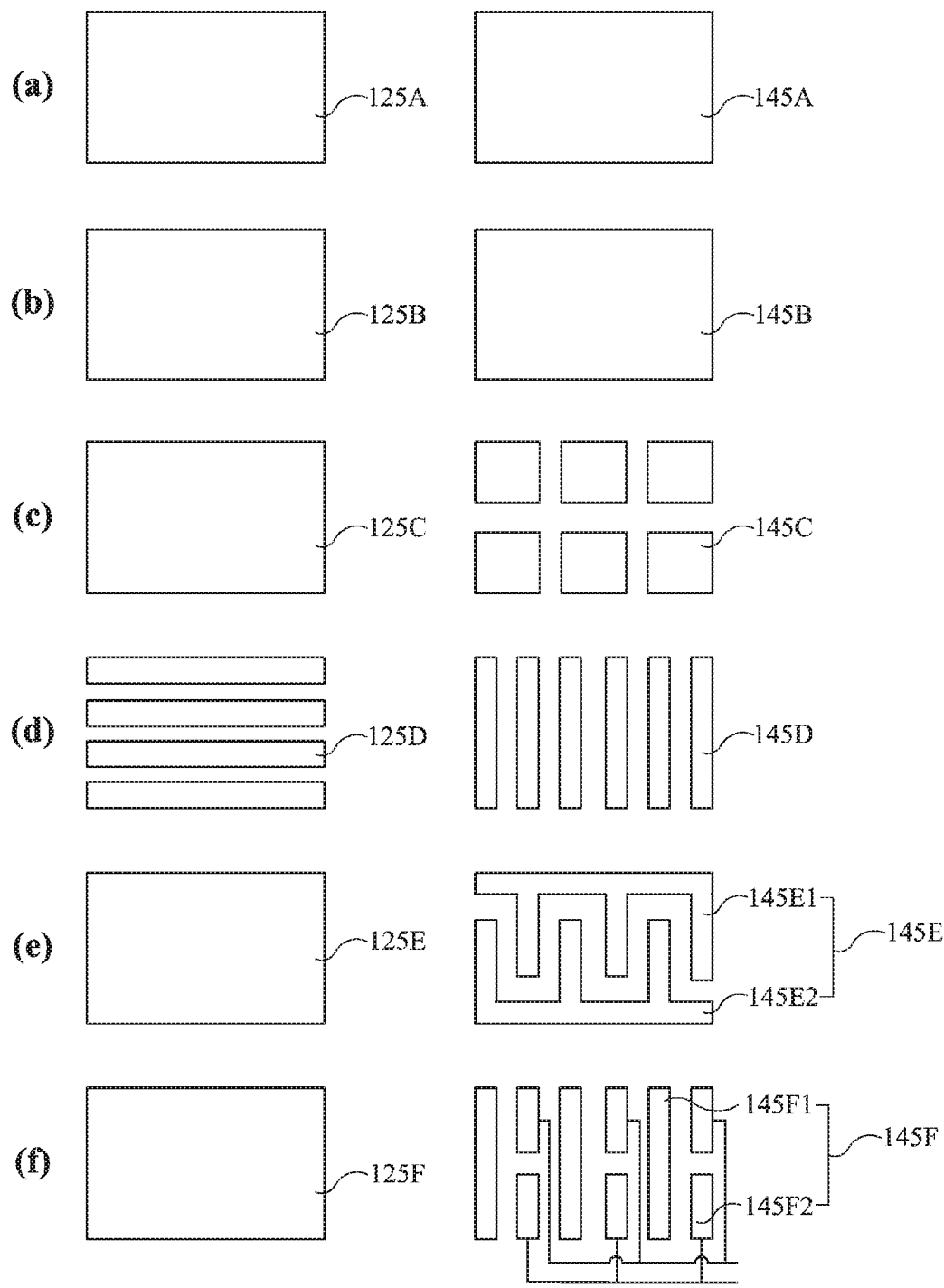
FIG. 2 illustrates examples of a plan view illustrating a first electrode and a second electrode of FIG. 1.

FIG. 2 illustrates an example of a plan view of the first electrode and the second electrode of FIG. 1. FIG. 2 is a view illustrating a variety of examples of the first electrode 125 and the second electrode 145. In FIG. 2, plan views illustrate 125A to 125F, which are a variety of examples of the first electrode 125, and 145A to 145D, 145E, 145E2, 145F1, and 145F2, which are a variety of examples of the second electrode 145.

Referring to FIG. 2(a), a first electrode 125A includes one integrally formed electrode, and a second electrode 145A also includes one integrally formed electrode. An input signal is applied to any one of the first electrode 125 and the second electrode 145A. The input signal may be, for example, a reference voltage. The reference voltage may be, for example, a ground voltage. The input signal may be, as another example, a sine wave, a square wave, a triangular wave, or a step function. The other of the first electrode 125A and the second electrode 145A outputs an output signal and is used for measuring a change in capacitance between the first electrode 125A and the second electrode 145A. When the first electrode 125A and the second electrode 145A approach each other due to pressure, the capacitance increases. Since each of the first electrode 125A and the second electrode 145A is integrally formed, it is not possible to measure a pressure position.

FIG. 2(b) is like FIG. 2(a), except that a hole is formed in a first electrode 125B. A change in capacitance may be much greater when the same pressure is applied to a central portion than when the same pressure is applied to a peripheral portion. A hole formed in a central portion of the first electrode 125B performs a function of alleviating a relatively great change in capacitance of the central portion. Although an example in which one hole is formed is shown in the drawing, a plurality of holes may be formed. Although an example in which the hole is formed in the first electrode 125B is shown in the drawing, a hole may be formed in the second electrode 145B or holes may be formed in both the first electrode 125B and the second electrode 145B, differing from the drawing.

FIG. 2(c) is like FIG. 2(a) except for a second electrode 145C divided into a plurality of parts. An input signal is applied to a first electrode 125C. A second electrode 145C is used for measuring a change in capacitance between the first electrode 125C and the second electrode 145C. The second electrode 145C is divided into six areas and has six output signals. On the basis of the six output signals, a pressure position as well as pressure intensity may be measured. Although an example in which the second electrode 145C is divided is shown in the drawing, the first electrode 125C may be divided or both the first and second electrodes 125C and 145C may be divided, differing from the drawing. Although an example of being divided into six areas is shown in the drawing, division into more or less than six areas may be possible, differing from the drawing.

Referring to FIG. 2(d), both a first electrode 125D and a second electrode 145D are divided into a plurality of areas. The first electrode 125D includes a plurality of electrodes formed in a first direction such as a lateral direction, and the second electrode 145D includes a plurality of electrodes formed in a second direction such as a longitudinal direction. An input signal may be applied to the first electrode 125D, and an output signal may be output by the second electrode 145D. Otherwise, an input signal may be applied to the second electrode 145D, and an output signal may be output by the first electrode 125D. The input signal may be, for example, a sine wave, a square wave, a triangular wave, or a step function. Since each of the first electrode 125D and the second electrode 145D is divided into the plurality of areas, a pressure position as well as pressure intensity may be measured.

Referring to FIG. 2(e), a first electrode 125E includes one integrally formed electrode, and a second electrode 145E includes two electrodes 145E1 and 145E2 adjacent to each other. A first input signal is applied to the first electrode 125E. The first input signal may be a reference voltage such as a ground voltage. A second input signal is applied to one of the two electrodes 145E1 and 145E2. The second step function. An output signal is output by the other of the two electrodes 145E1 and 145E2. When a distance between the first electrode 124E and the second electrode 145E is reduced by pressure, mutual capacitance between the two electrodes 145E1 and 145E2 is reduced. The output signal is used for measuring a change in the mutual capacitance. Although an example in which the first electrode 125E is integrally formed and the second electrode 145E includes the two electrodes 145E1 and 145E2 is shown in the drawing, the first electrode 125E may include two electrodes and the second electrode 145E may be integrally formed, differing from the drawing. Although the first electrode 125E does not have a hole in the drawing, the first electrode 125E may have one or more holes, differing from the drawing. Although an example in which the second electrode 145E includes the two electrodes 145E1 and 145E2 is shown in the drawing, the second electrode 145E may be divided into a plurality of areas and each of the areas may include two electrodes, differing from the drawing. In this case, since the same number of output signals are present as the number of the areas, a pressure position may be calculated.

Referring to FIG. 2(f), a first electrode 125F includes one integrally formed electrode and a second electrode 145F includes a plurality of electrodes 145F1 formed in a first direction such as a longitudinal direction and a plurality of electrodes 145F2 formed in a second direction such as a lateral direction. A first input signal is applied to the first electrode 125F. The first input signal may be a reference voltage, for example, a ground voltage. Second input signals are applied to the plurality of electrodes 145F1 formed in the first direction, and output signals are output from the plurality of electrodes 145F2 formed in the second direction. Otherwise, second input signals are applied to the plurality of electrodes 145F2 formed in the second direction, and output signals are output from the plurality of electrodes 145F1 formed in the first direction. The second input signal may be, for example, a sine wave, a square wave, a triangular wave, or a step function. When a distance between the first electrode 125F and the second electrode 145F is reduced by pressure, mutual capacitance between the plurality of electrodes 145F1 formed in the first direction and the plurality of electrodes 145F2 formed in the second direction is reduced. The output signal is used for measuring a change in the mutual capacitance. Although an example in which the first electrode 125F is integrally formed and the second electrode 145F includes the electrodes 145F1 and 145F2 is shown in the drawing, the first electrode 125F may include electrodes and the second electrode 145F may be integrally formed, differing from the drawing. Although the first electrode 125F does not have a hole in the drawing, the first electrode 125F may have one or more holes, differing from the drawing.

Figure 3A:
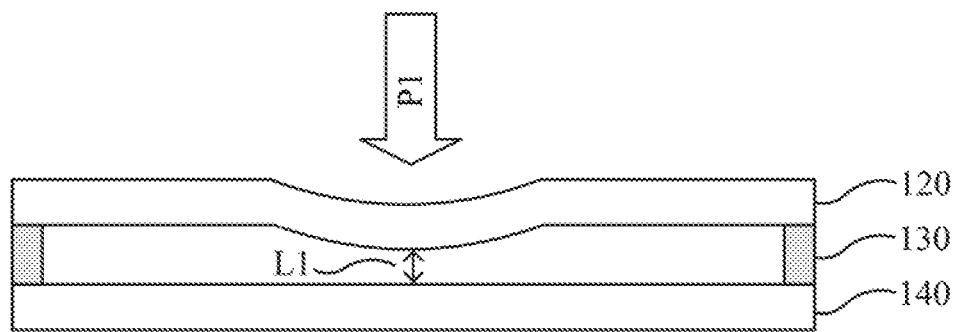
FIG. 3 illustrates examples of a cross-sectional view of a touch pressure panel.

FIG. 3 illustrates examples of a cross-sectional view of the touch pressure panel. FIG. 3(a) is an example in which only components of the touch pressure panel of FIG. 1 are shown. A basic principle of measuring touch pressure intensity will be described on the basis of FIG. 3(a). FIG. 3(a) is an example in which touch input having intensity of P1 is applied to a central area of the touch pressure panel.

When a user pushes the touch panel 110, the first electrode layer 120 is uniformly physically bent by touch pressure. Since the spacer layer 130 is located between the first electrode layer 120 and the second electrode layer 140, the first electrode layer 120 may be bent more easily. When the first electrode layer 120 is bent, a distance between the first electrode layer 120 and the second electrode layer 140 decreases. Referring to FIG. 1, the distance between the first electrode layer 120 and the second electrode layer 140 is L0 in a state in which touch pressure is not present. Referring to FIG. 3(a), the distance between the first electrode layer 120 and the second electrode layer 140 is decreased by touch pressure. In FIG. 3(a), the distance between the first electrode layer 120 and the second electrode layer 140 is L1, which is smaller than L0.

When the distance between the first electrode layer 120 and the second electrode layer 140 decreases, capacitance measured from an output signal changes. In the case of the examples corresponding to FIGS. 2(a) to (d), as the distance between the first electrode layer and the second electrode layer decreases, the capacitance between the first electrode layer and the second electrode layer increases. In the case of the examples corresponding to FIGS. 2(e) and (f), as the distance between the first electrode layer and the second electrode layer decreases, capacitance between the divided electrodes of the second electrode layer decreases. As the distance between the first electrode layer 120 and the second electrode layer 140 decreases, an amount of change in the capacitance between the first electrode layer 120 and the second electrode layer 140 increases. As the distance between the first electrode layer 120 and the second electrode layer 140 increases, the amount of change of the capacitance decreases. Touch pressure intensity is determined by how much the capacitance changes from the beginning instance of touch.

Figure 3B:
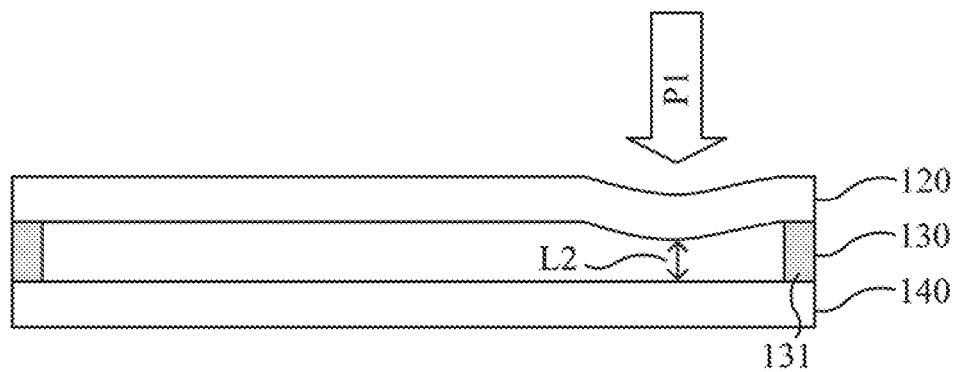

The distance between the first electrode layer 120 and the second electrode layer 140 may vary according to a position at which touch input occurs, even when the same pressure is applied. FIG. 3(b) is an example in which only components of the touch pressure panel of FIG. 1 are shown. In FIG. 3(b), unlike FIG. 3(a), the touch input having an intensity of P1 is applied to an edge of the touch pressure panel. In FIG. 3(b), a touch pressure having the same intensity P1 as that of FIG. 3(a) is applied.

The partition wall 131 is present on an edge of the spacer layer 130. The partition wall 131 may have a variety of mechanical components. When touch input occurs near the partition wall 131, a uniform repulsive force occurs in a direction opposite to a touch pressure direction, due to a physical structure of the partition wall 131. Accordingly, even when the touch pressure having intensity of P1 is applied to the edge of the touch pressure panel, the distance between the first electrode layer 120 and the second electrode layer 140 may differ from that of FIG. 3(a). Referring to FIG. 3(b), the distance between the first electrode layer 120 and the second electrode layer 140 is L2, which is longer than L1. There is a relationship in which L1<L2 L0.

Even when a user applies touch input having the same intensity, the touch input device may recognize the intensity differently according to a touch input position. The following technology is for solving the above problems. That is, the following technology is for compensating measured touch input intensity so that touch input intensity is uniform according to a touch input position. According to the following technology, touch input having the same intensity may be compensated so that touch input intensity is at a uniform level regardless of touch position.

Additionally, another component configured to support the first electrode layer 120 and the second electrode layer 140 may be present besides the partition wall 131 according to a physical configuration of the touch pressure panel. For example, a structure such as a column may be present in a central portion of the touch pressure panel. For convenience of description, it is assumed that a component like the partition wall 131 shown in FIG. 1 is present between the first electrode layer 120 and the second electrode layer 140.

The following method of compensating pressure intensity may be applied to the above-described touch pressure panel for measuring capacitance.

Figure 4:
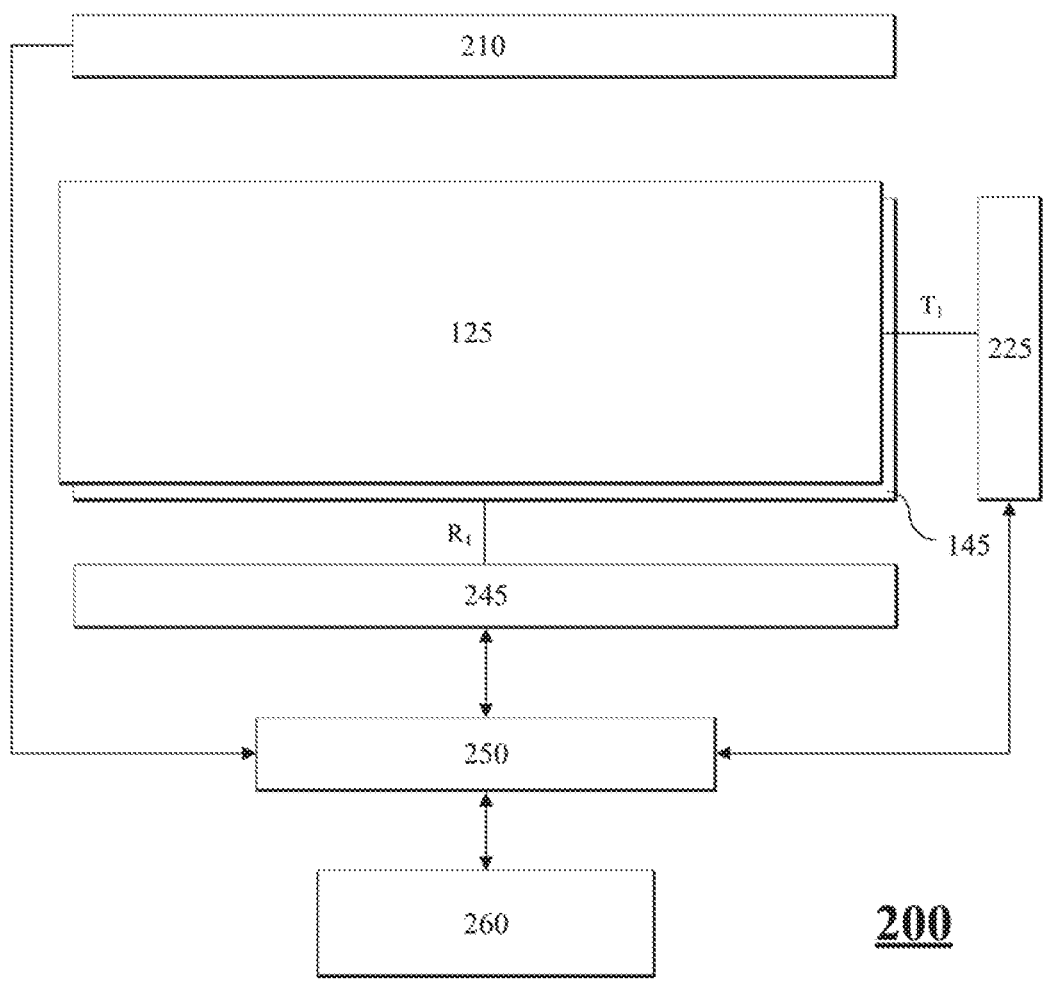
FIG. 4 illustrates an example of a block diagram illustrating a configuration of a touch input device configured to sense touch pressure intensity.

FIG. 4 illustrates an example of a block diagram illustrating a configuration of a touch input device 200 configured to sense touch pressure intensity. FIG. 4 illustrates an example of the touch input device 200 configured to sense touch pressure intensity using an amount of change in capacitance.

The touch input device 200 includes a touch panel 210, the first electrode 125, a first electrode circuit 225, the second electrode 145, a second electrode circuit 245, a controller circuit 250, and a memory 260.

The touch panel 210 senses a touch input position using a plurality of driving electrodes and a plurality of receiving electrodes. The drawing does not illustrate a detailed configuration of the touch panel 210.

As shown in FIG. 1, the first electrode 125 is formed on the first insulating film 121 and the second electrode 145 is formed on the second insulating film 141. On the other hand, either the first electrode 125 or the second electrode 145 may not be formed on a certain insulating film and may be formed as one metal layer.

The first electrode circuit 225 applies an input signal Ti to the first electrode 125. When the first electrode 125 has a shape like that shown in FIGS. 2(a) to 2(c), 2(e), and 2(f), the first electrode 125 is one integrally formed electrode. In this case, the first electrode circuit 225 applies one signal Ti to the first electrode 125. The input signal Ti may be, for example, a reference voltage. The reference voltage may be, for example, a ground voltage. The input signal Ti may be, as another example, a sine wave, a square wave, a triangular wave, or a step function. In the case of FIG. 2(d), the first electrode 125 includes the plurality of electrodes formed in the first direction. In this case, the first electrode circuit 225 applies signals Ti, which are to be sequentially provided to the plurality of electrodes, to the first electrode 125. Input signal Ti may be, for example, a sine wave, a square wave, a triangular wave, or a step function.

The second electrode circuit 245 receives an output signal $R_1$ from the second electrode 145. When the second electrode 145 has a shape like that shown in FIGS. 2(a) and 2(b), the second electrode 145 outputs one signal $R_1$. When the second electrode 145 has a shape like that shown in FIGS. 2(c) and 2(d), the second electrode 145 outputs a plurality of signals $R_1$. When the second electrode 145 has a shape like that shown in FIG. 2(e), the second electrode 145 is divided into the two electrodes 145E1 and 145E2 such that an additional input signal is applied to one thereof and the output signal $R_1$ is output from the other. The additional input signal may be, for example, a sine wave, a square wave, a triangular wave, or a step function. When the second electrode 145 has a shape like that shown in FIG. 2(f), the second electrode includes the plurality of electrodes 145F1 formed in the first direction and the plurality of electrodes 145F2 formed in the second direction. The additional input signals are applied to the plurality of electrodes 145F1 formed in the first direction, and the output signals $R_1$ are output from the plurality of electrodes 145F2 formed in the second direction. Otherwise, the additional input signals are applied to the plurality of electrodes 145F2 formed in the second direction, and the output signals $R_1$ are output from the plurality of electrodes 145F1 formed in the first direction. The additional input signal may be, for example, a sine wave, a square wave, a triangular wave, or a step function.

When the first electrode circuit 225 applies the input signal Ti to the first electrode 125, the second electrode circuit 245 receives the output signal $R_1$. The second electrode circuit 245 may calculate capacitance between the first electrode 125 and the second electrode 145 or capacitance among the electrodes formed by dividing the second electrode 145. When the second electrode circuit 245 calculates capacitance, the measured capacitance or an amount of change in the capacitance is transmitted to the controller circuit 250. Additionally, the controller circuit 250 may receive a signal from the second electrode circuit 245 and may calculate an amount of change in capacitance.

The amount of change in capacitance refers to a degree of how much capacitance changes from a point in time when touch is not present. The second electrode circuit 245 or the controller circuit 250 may measure the amount of change in capacitance on the basis of capacitance at a point in time when touch input starts.

The controller circuit 250 may control the first electrode circuit 225 and the second electrode circuit 245. Additionally, the controller circuit 250 may receive a touch input position from the touch panel 210 and may receive a certain reception signal or capacitance (an amount of change in capacitance) from the second electrode circuit 245. The controller circuit 250 compensates the amount of change in capacitance (touch pressure intensity) by referring to a compensation table in which data for compensating touch pressure intensity according to a position of touch is mapped. The memory 260 prestores the compensation table.

For example, the controller circuit 250 may compensate capacitance (5+10=15) by adding a compensation value 5 corresponding to a position of touch (x1, y5) to a measured capacitance 10. Here, a random natural number is used as a value for convenience of description.

Additionally, the controller circuit 250 may compensate a change in capacitance by using a certain compensation function. The compensation function may be a function for calculating a certain compensation value by using a touch input position as a parameter. Also, the compensation function may be a function for calculating a change value of capacitance compensated using a touch input position and a change value of measured capacitance as parameters. The memory 260 may store data with respect to the compensation function.

As described above, the touch input device 200 compensates touch pressure intensity according to a touch input position. Accordingly, the touch input device 200 should obtain the touch input position. The touch input device 200 obtains the touch input position using the touch panel 210. However, it is unnecessary that the touch input device 200 must obtain a touch input position using the touch panel 210. For example, (1) the touch input device 200 may obtain a touch input position using a plurality of pressure sensors. For example, when the first electrode 125 and the second electrode 145 have structures like those shown in FIGS. 2(c), 2(d), and 2(f), the touch input device 200 may detect a pressure position as well as pressure intensity by using the input signal Ti and the reception signal $R_1$. (2) The touch input device 200 may obtain a touch input position by using an optical sensor such as an infrared sensor. (3) The touch input device 200 may obtain a touch input position by analyzing images collected by a camera.

As described above, in touch pressure panels, there is a type which measures an amount of change in mutual capacitance and a type which measures an amount of change of self-capacitance. Also, the touch input device 200 may compensate pressure intensity according to an input position for each type. Hereinafter, for convenience of description, the type which measures an amount of change in self-capacitance will be described.

Figure 5:
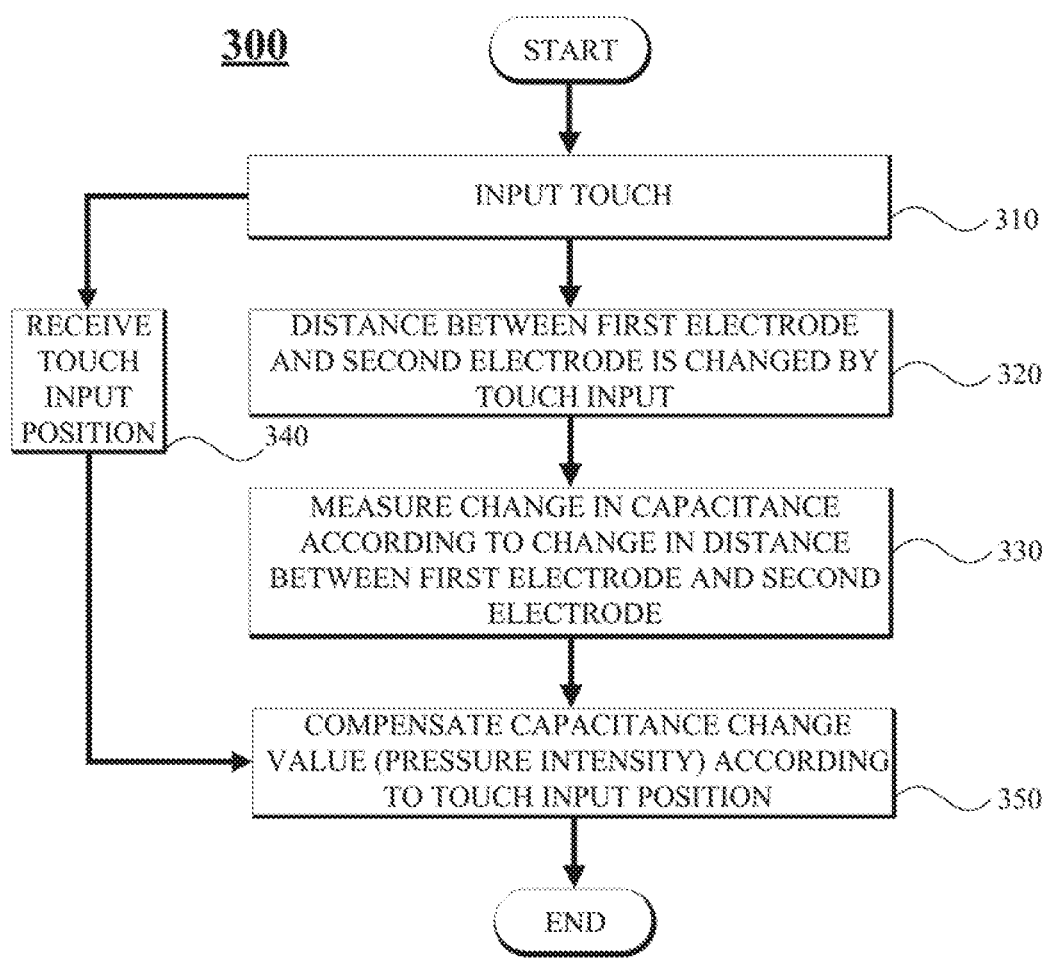
FIG. 5 illustrates an example of a flowchart illustrating a method of compensating pressure intensity according to an input position in a touch input device.

FIG. 5 illustrates an example of a flowchart illustrating a method 300 of compensating pressure intensity according to an input position in the touch input device.

The user touches the touch panel of the touch input device 200. In other words, the touch input device 200 senses touch input (310). A distance between the first electrode 125 and the second electrode 145 is changed by the touch input.

The touch input device 200 measures a change in capacitance according to a change in the distance between the first electrode 125 and the second electrode 145 at the touch input position (330). The touch input device 200 calculates an amount of change in capacitance by comparing capacitance in a state without touch with capacitance after touch input occurs.

When touch input occurs (310), the touch input device 200 receives a touch input position (340). Although a variety of methods may be used, the touch input device 200 may receive the touch input position, for example, from the touch panel.

Then, the touch input device 200 compensates capacitance (or an amount of change in capacitance) at the position in which the touch input occurs according to the touch input position (350).

The touch input device 200 or the controller circuit 250 may compensate the amount of change in capacitance by using the compensation table. As described above, the touch input device 200 may compensate a degree of change in capacitance by adding, to a measured degree of change in capacitance, compensation data which corresponds to the touch input position. Additionally, the touch input device 200 may compensate the degree of change in capacitance by multiplying the degree of change in capacitance by compensation data which corresponds to the touch input position.

Additionally, the touch input device 200 or the controller circuit 250 may compensate the amount of change in capacitance by using a certain compensation function. The compensation function may be a function for calculating a certain compensation value by using a touch input position as a parameter. Also, the compensation function may be a function for calculating a change value of capacitance compensated using a touch input position and a change value of measured capacitance as parameters. The memory 260 may store data with respect to the compensation function. Otherwise, the controller circuit 250 may include an embedded compensation function.

A material which forms the touch input device 200 may change in degree of bending or bending properties according to changes in environments (temperature, humidity, or the like), deterioration of devices, and the like. In this case, the touch input device 200 should monitor a reference for determining an amount of change in capacitance. As described above, the touch input device 200 determines touch pressure intensity by measuring capacitance which occurs after touch is input, on the basis of capacitance in a state without touch. Accordingly, the reference for determining the amount of change in capacitance may be a capacitance value in a state in which touch is not input. Capacitance measured from an output signal in the state in which touch is not input is referred to as reference capacitance (Cm). The touch pressure intensity may be checked by measuring a change ΔCm between the reference capacitance and measured capacitance.

Figure 6:
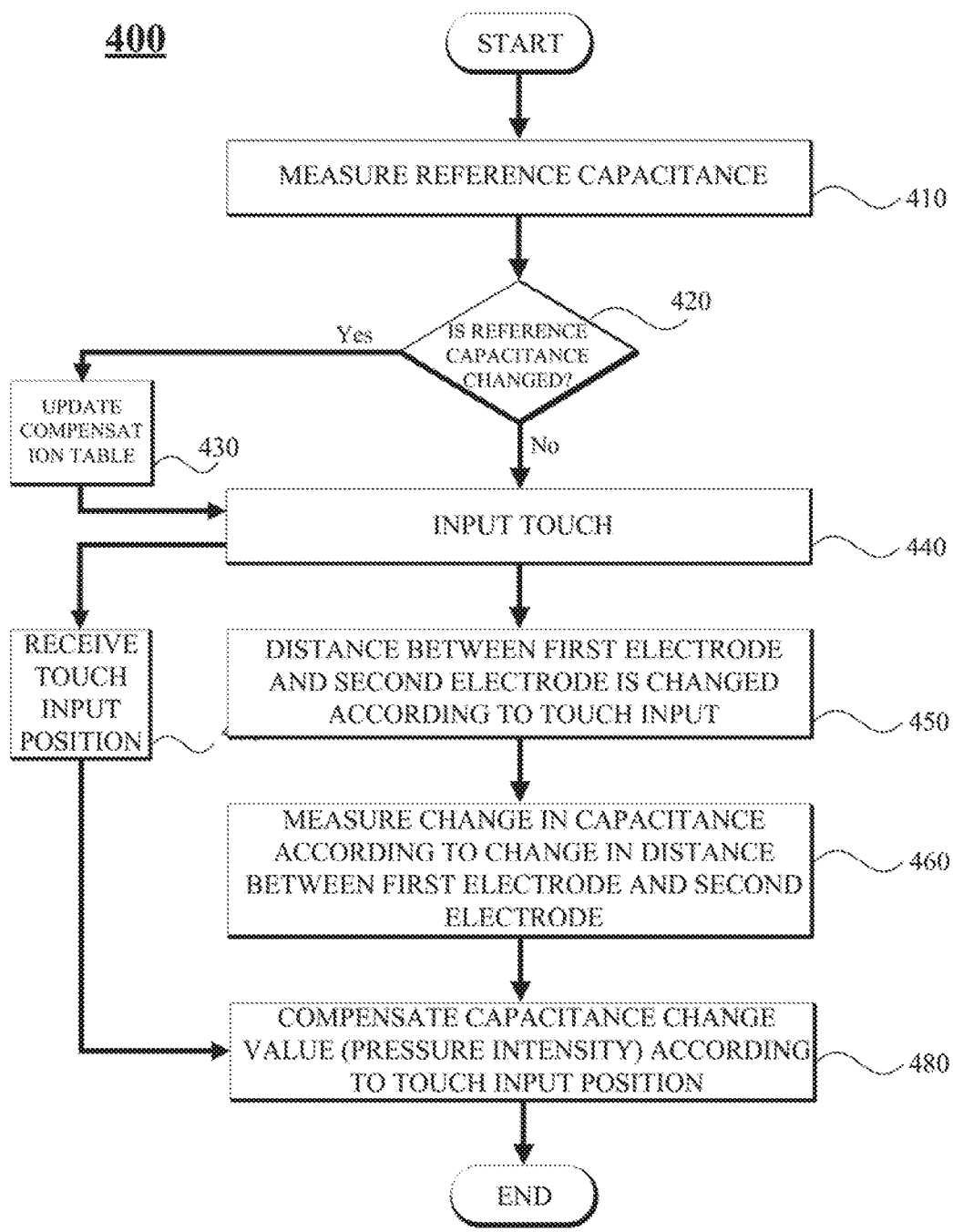
FIG. 6 illustrates another example of a flowchart illustrating a method of compensating pressure intensity according to an input position in a touch input device.

FIG. 6 illustrates another example of a flowchart illustrating a method 400 of compensating pressure intensity according to an input position in the touch input device. The touch input device 200 measures self-capacitance (reference capacitance) between the first electrode and the second electrode in a state in which touch is not input (410). The touch input device 200 measures and stores the reference capacitance.

The touch input device 200 measures the reference capacitance (410) and determines whether a change occurs in the reference capacitance by comparing with a previously measured reference capacitance (420). When the reference capacitance is changed, it is necessary for the touch input device 200 to reflect a value corresponding to the reference capacitance changed during a process of measuring touch pressure intensity. The touch input device 200 may update the compensation table according to an amount of change of the reference capacitance (430). For example, the touch input device 200 may add or subtract a certain value to or from all of the data of the compensation table. Also, the touch input device 200 may add or subtract different values to or from the data of the compensation table for each position.

The touch input device 200 may periodically measure a change in the reference capacitance. Also, the touch input device 200 may measure a change in the reference capacitance at the time that power is applied to the touch input device 200.

The touch input device 200 senses touch input (440). A distance between the first electrode and the second electrode is changed by the touch input (450). The touch input device 200 measures a change in capacitance according to a change in the distance between the first electrode and the second electrode at a touch input position (460). When the touch input occurs (440), the touch input device 200 receives the touch input position (470). For example, the touch input device 200 may receive the touch input position from the touch panel. Then, the touch input device 200 compensates capacitance (or an amount of change in capacitance) at the position in which the touch input occurs, in accordance with the touch input position and on the basis of the compensation table (480).

FIG. 6 relates to an example in which the touch input device 200 compensates the amount of change in capacitance by using the compensation table. Unlike the shown in FIG. 6, the touch input device 200 may compensate the amount of change in capacitance by using the above-described compensation function. In this case, the touch input device 200 may modify the compensation function to correspond to the change in the reference capacitance in operation 430. For example, the touch input device 200 may correct a constant used for the compensation function or may add a parameter or constant value to the compensation function.

Meanwhile, the touch input device 200 using the touch pressure panel may measure reference capacitance with respect to a plurality of points. In this case, the touch input device 200 may update the compensation table when the reference capacitance differs with respect to the plurality of points. The touch input device 200 may measure reference capacitance at a plurality of points, determine whether the reference capacitance differs with respect to the plurality of points, and update the compensation table. In this case, the touch input device 200 may update only compensation data with respect to a particular point at which the reference capacitance differs from those of other points.

FIG. 6 illustrates an example in which the touch input device 200 manages one compensation table. Additionally, the touch input device 200 may use a plurality of compensation tables. The plurality of compensation tables are tables previously determined according to reference capacitance values. In this case, the touch input device 200 may measure reference capacitance and may compensate a degree of change in capacitance by using the compensation table corresponding to the reference capacitance value corresponding to the measured reference capacitance.

Hereinafter, an example of the compensation table used by the touch input device 200 for compensating touch pressure intensity (an amount of change in capacitance) will be described below. As described above, the compensation table is managed by the controller circuit 250 and stored in the memory 260. In the compensation table, a certain compensation value is mapped for each point (position) at which capacitance is measured. When touch input occurs, the touch input device 200 searches in the compensation table for a point corresponding (or adjacent) to a touch input position and extracts a corresponding compensation value to compensate measured capacitance. A variety of types of compensation tables may be used. (1) A manufacturer of the touch input device may generate a compensation table in advance in consideration of bending properties of a physical configuration or structural properties of an edge portion of the touch input device. (2) Otherwise, the manufacturer may measure degrees of bending with respect to a plurality of positions during a process of manufacturing the touch input device and may generate a compensation table which reflects the measurement results. (3) Additionally, a compensation value may be previously determined with respect to a certain area by reflecting physical properties and structural properties of the touch input device, degrees of bending may be measured during the manufacturing process with respect to only other areas, and a compensation table which reflects the measurement results may be generated. For example, a central area of the touch panel generally has a uniform degree of bending. Accordingly, a certain compensation value may be preset with respect to the central area of the touch panel and a degree of bending may be measured for each actual device with respect to an edge portion of the touch panel to generate a compensation table.

The compensation table generally stores data for compensating the central area of the touch panel with a small value or for not compensating the central area. Also, the compensation table generally stores data for compensating the edge area of the touch panel with a value greater than that of measured capacitance.

For convenience of description, a description will be provided about which compensation value is used according to a particular area or position of a touch input device such as a smart phone. FIG. 7 illustrates an example of a compensation value for compensating pressure intensity in a touch input device. An area A1 shown as a dotted line circle in FIG. 7 refers to a central area of a touch panel (or a touch pressure panel). The central area may be an area which does not need additional compensation with respect to measured capacitance. However, a size or a shape of the central area may differ from that shown in FIG. 7. Although a touch position may be described on the basis of a touch pressure panel, for convenience of description, hereinafter, the touch position will be described on the basis of a touch panel.

Figure 7B:
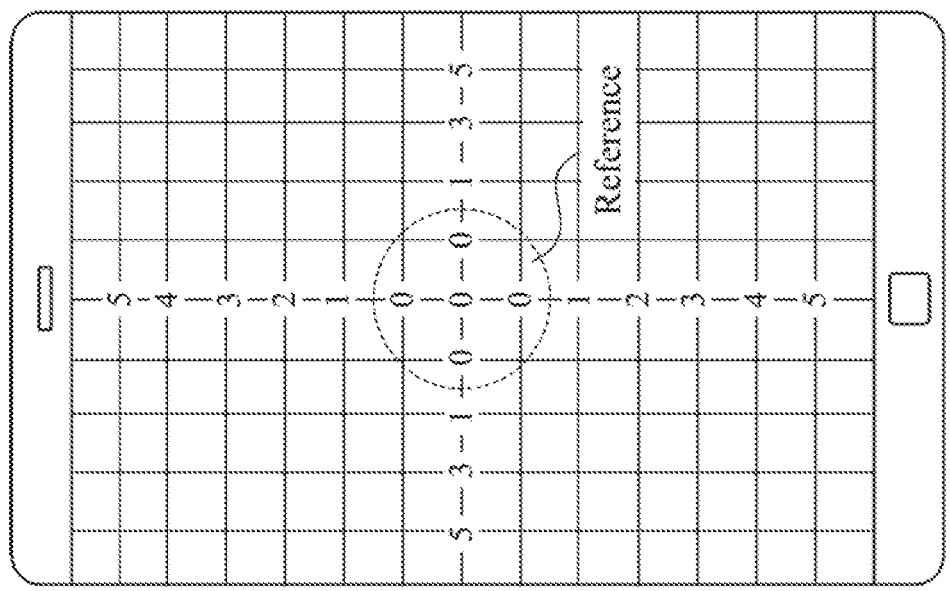
FIG. 7 illustrates an example of a compensation value for compensating the pressure intensity in a touch input device.
Figure 7A:
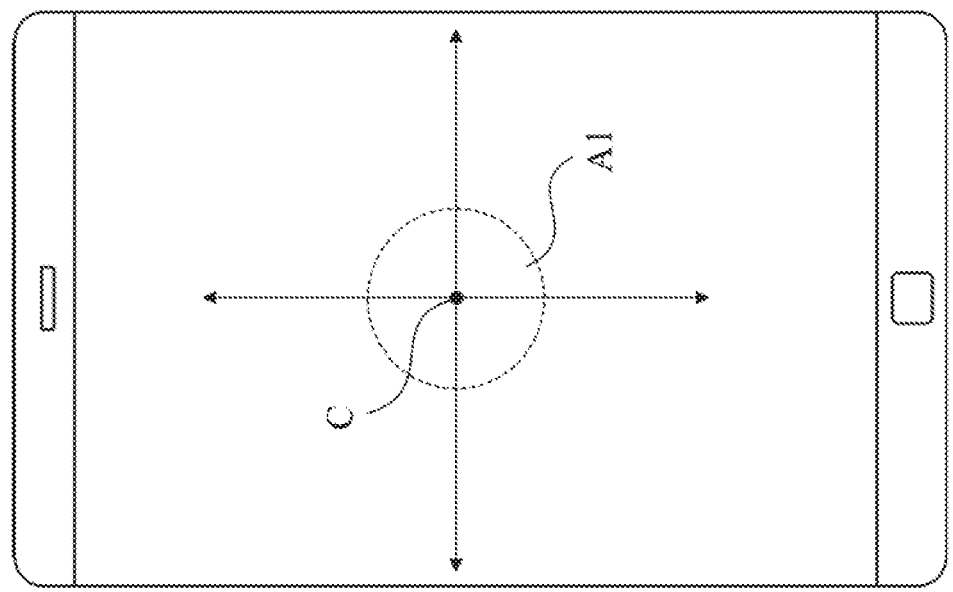

FIG. 7(a) illustrates an example in which the directions going from a central position C of the touch panel to edge areas of the touch panel are shown as arrows. FIG. 7(b) illustrates an example in which some values of a compensation table area are shown. Although the touch input device manages the compensation table in the form of an actual table, for convenience of description, compensation values are shown on the basis of positions in the touch panel in FIG. 7(b). FIG. 7(b) illustrates an example in which a central area is set as a reference and pressure intensities in other areas are compensated on the basis thereof. FIG. 7(b) illustrates an example in which capacitance measured in the central area is not compensated and areas farther from the central position and toward the edge of the touch panel are compensated with a greater compensation value. Referring to FIG. 7(b), a compensation value in the central area is 0. When the compensation value is 0, it means that measured capacitance is not compensated. Referring to FIG. 7(b), past the central area, the compensation value increases closer to the edges of the touch panel. That is, an actually measured level of capacitance is compensated by reflecting a greater compensation value closer to the edges of the touch panel. When the compensation value is 1 or more, the touch input device compensates, in proportion to the compensation value, so that a driving electrode and a receiving electrode become closer in distance than they actually are. FIG. 7(b) illustrates as an example only a few directions.

Figure 8B:
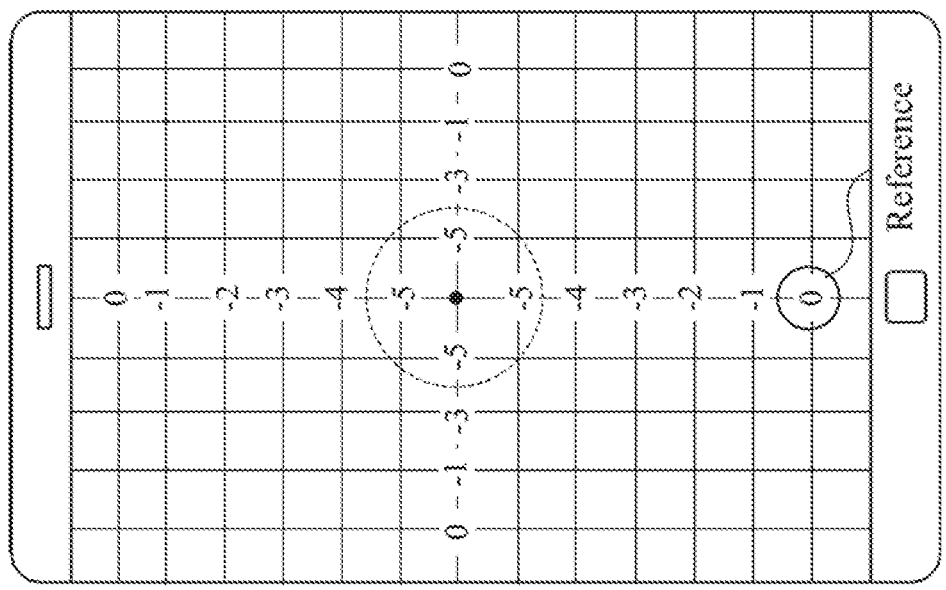
FIG. 8 illustrates another example of a compensation value for compensating the pressure intensity in a touch input device.
Figure 8A:
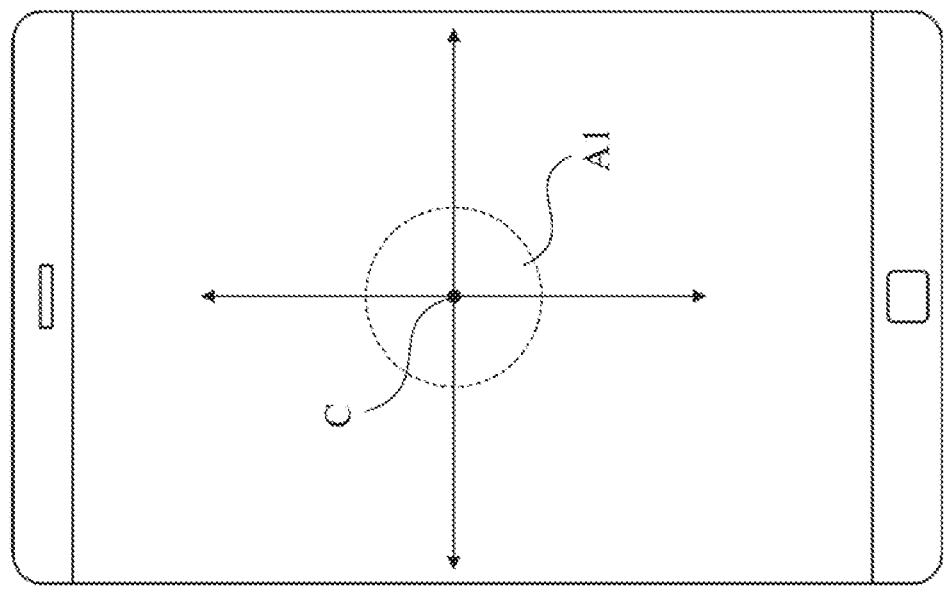

FIG. 8 illustrates another example of a compensation value for compensating pressure intensity in the touch input device. An area A1 shown as a dotted line circuit in FIG. 8 refers to a central area of the touch panel. FIG. 8(a) illustrates an example in which directions going from a central position C of the touch panel to edge areas of the touch panel are shown as arrows. FIG. 8(b) corresponds to a compensation table having the same effect as that of the one shown in FIG. 7(b). In FIG. 7(b), a value which increases in the positive direction going from the central position C toward the edges of the touch panel is used. In FIG. 8(b), a compensation value which increases in the negative direction going from the edges toward the central position of the touch panel is used. When the compensation table shown in FIG. 8(b) is used, the touch input device does not compensate capacitance measured at the edges of the touch panel and compensates capacitance measured in other areas excluding the edges. For example, FIG. 8(b) illustrates an example in which a point at the outermost edge is set to be a reference and pressure intensities with respect to other areas are compensated on the basis thereof. In FIG. 8, one of the reference points is shown as a solid line circle. Hereinafter, for convenience of description, a description will be provided on the premise that a positive compensation value is used like that shown in FIG. 7(b).

Figure 9B:
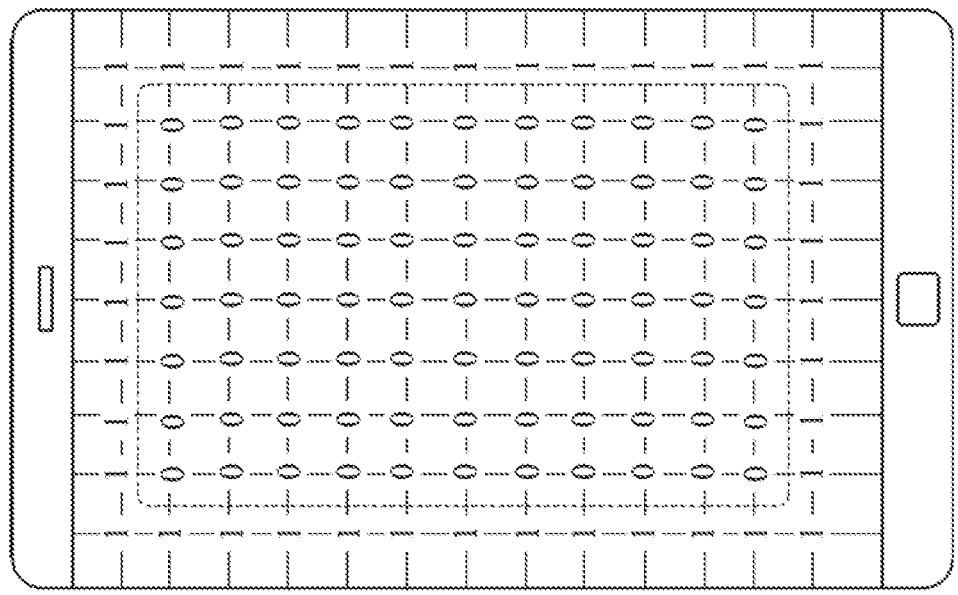
FIG. 9 illustrates still another example of a compensation value for compensating the pressure intensity in a touch input device.
Figure 9A:
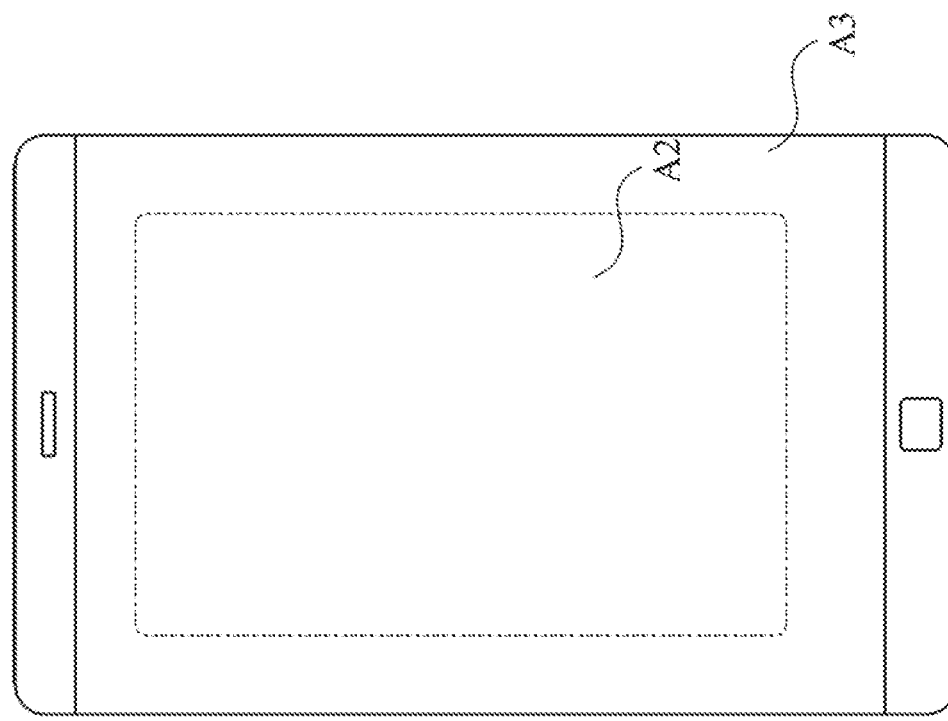

FIG. 9 illustrates still another example of a compensation value for compensating pressure intensity in the touch input device. FIG. 9(a) illustrates an example in which the touch panel area is divided. In FIG. 9(a), A2 refers to a central area and A3 refers to an edge area. FIG. 9(b) illustrates an example of compensation values with respect to the divided areas in FIG. 9(a). Referring to FIG. 9(b), A2 has a compensation value of 0 and A3 integrally has a compensation value of 1. That is, it is an example in which certain compensation values are used in advance in consideration of structural properties of the touch input device.

Figure 10A:
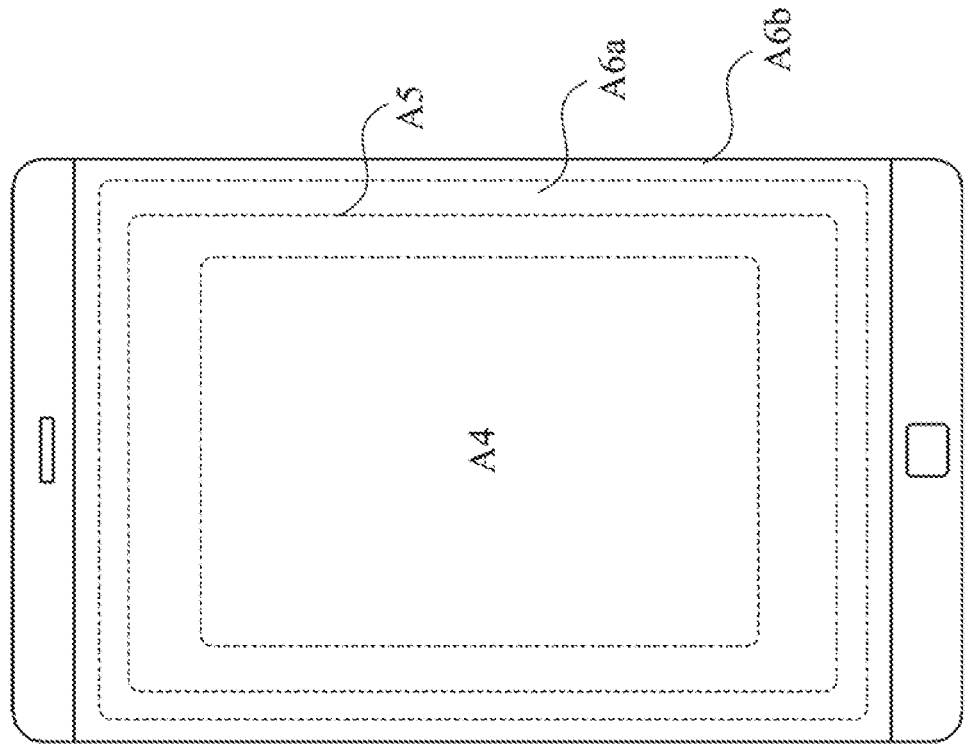
FIG. 10 illustrates yet another example of a compensation value for compensating the pressure intensity in a touch input device.

FIG. 10 illustrates yet another example of a compensation value for compensating pressure intensity in the touch input device. FIG. 10(a) illustrates an example in which a touch panel area is divided. Referring to FIG. 10(a), A4 refers to a central area of the touch panel and A5 and A6 refer to an edge area. The touch input device compensates capacitance measured in the edge area and does not compensate capacitance measured in the central area. A5 and A6 correspond to sub areas formed by additionally dividing the edge area. The touch input device may, by applying a compensation value greater than that of area A5, compensate capacitance measured in area A6. Compensation values of the areas have a relationship of A4>A5>A6.

Figure 10B:
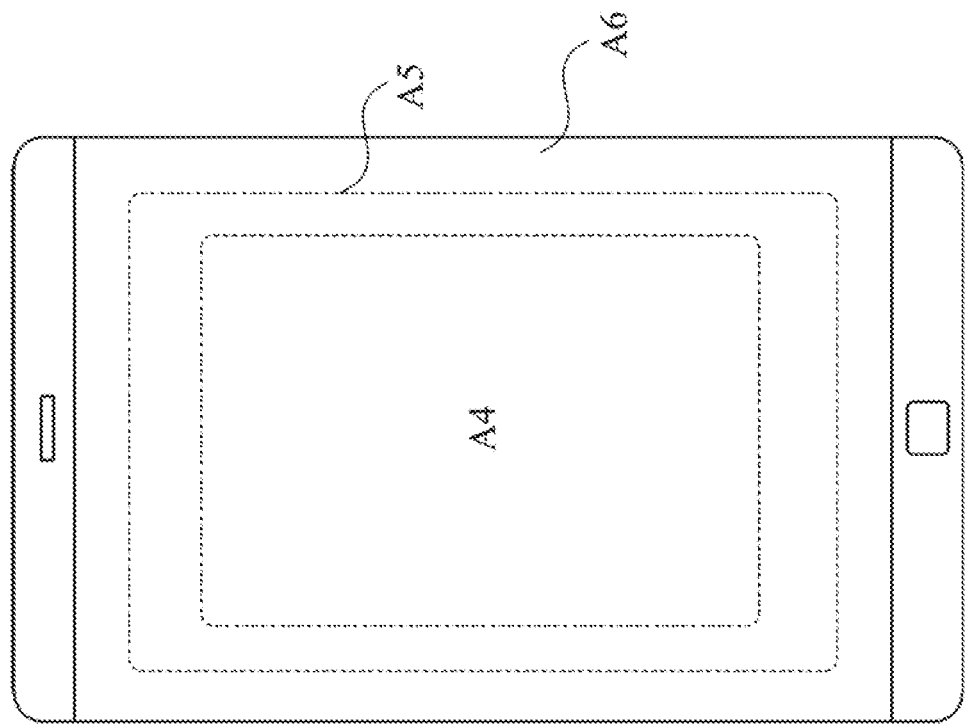

FIG. 10(b) illustrates another example of the divided areas of the touch panel. FIG. 10(b) illustrates an example of additionally dividing sub area A6 in FIG. 10(a). The touch input device may, by applying a compensation value greater than that of area A6a, compensate capacitance measured in area A6b. Compensation values of the areas have a relationship of A4>A5>A6a>A6b.

Figure 11:
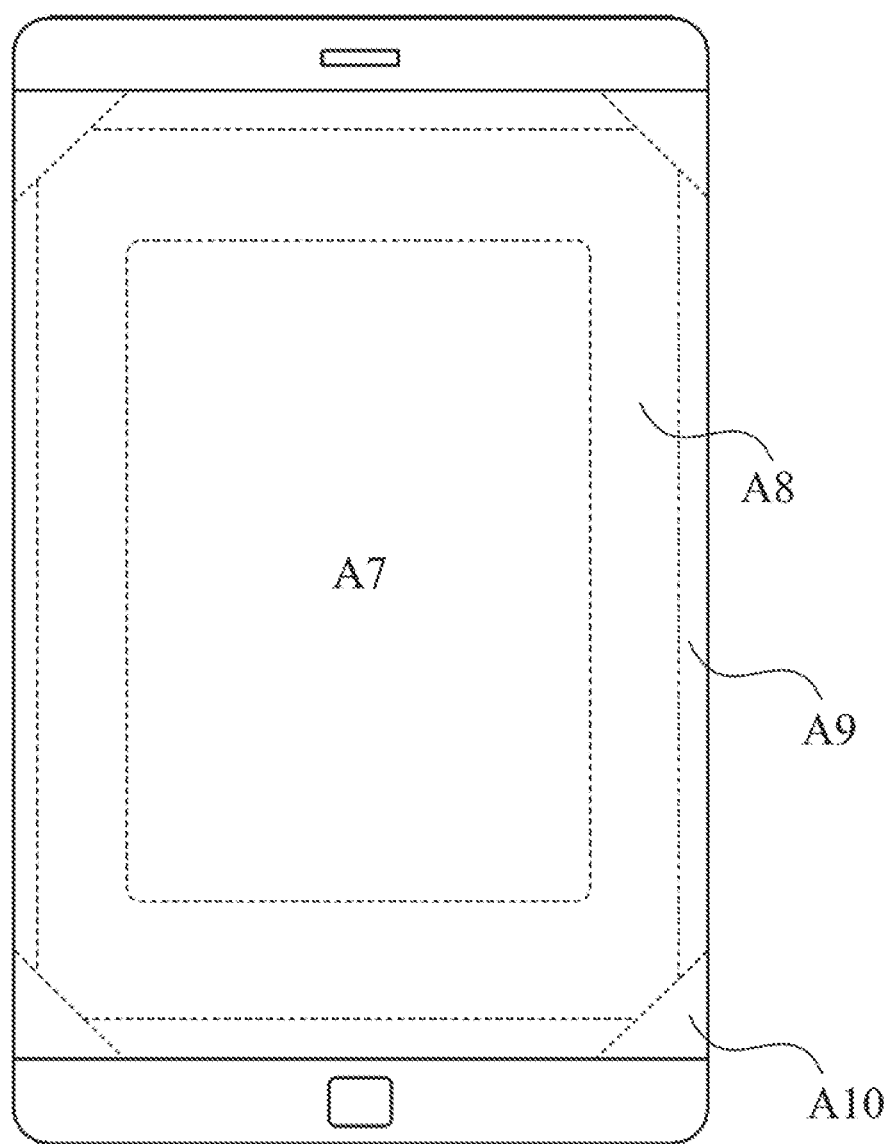
FIG. 11 illustrates even another example of a compensation value for compensating the pressure intensity in a touch input device.

FIG. 11 illustrates even another example of a compensation value for compensating the pressure intensity in the touch input device. As described above, the touch pressure panel may have a structure at the edge thereof, which supports the first electrode layer and the second electrode layer. In this case, the edge portion bends less than the central area. Additionally, the possibility that corner portions among the edge portions bend even less than other edge portions is high. This is because the corner portions are points at which the structures (the partition walls and the like), which support the first electrode layer and the second electrode layer, meet one another.

In FIG. 11, A7 refers to a central portion of the touch panel. In FIG. 11, A8, A9, and A10 refer to an edge area of the touch panel. A9 has a compensation value greater than that of A8. Corner area A10 may have a compensation value greater than that of A9. Compensation values of the areas have a relationship of A7>A8>A9>A10.

In conclusion, the compensation table is for compensating for a lesser degree of bending according to a touch position in the touch pressure panel. Eventually, the compensation table may be formed in consideration of both properties of the material of the touch input device and the structure of the touch input device. In the structure of the touch input device, the structure which supports the first electrode layer and the second electrode layer may fundamentally have the greatest effect. Additionally, a pattern formed on the first electrode layer or the second electrode layer may have an effect on a degree bending of the first electrode layer or the second electrode layer.

Figure 12B:
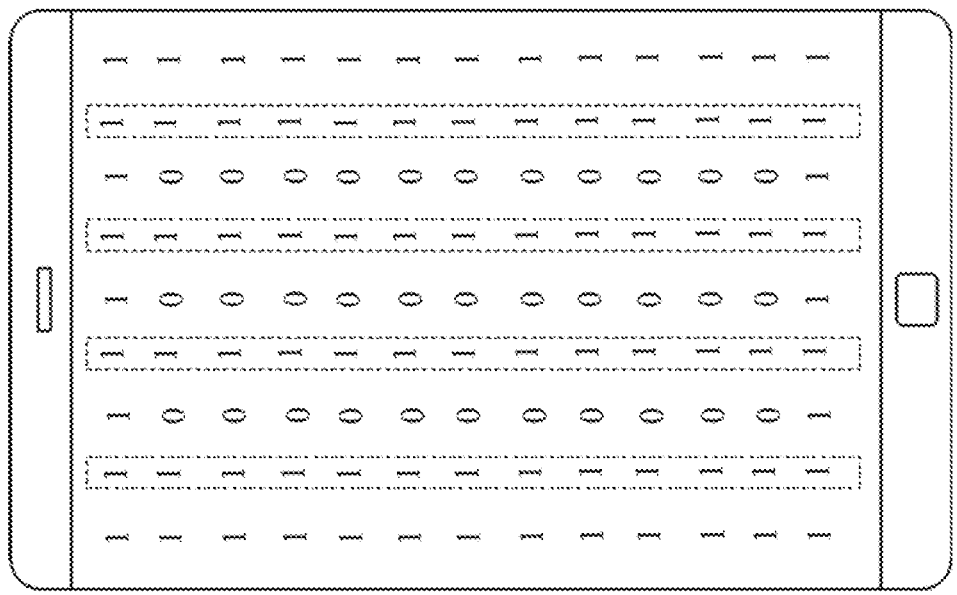
FIG. 12 illustrates an example of a compensation value for compensating pressure intensity in a touch input device including an electrode pattern.
Figure 12A:
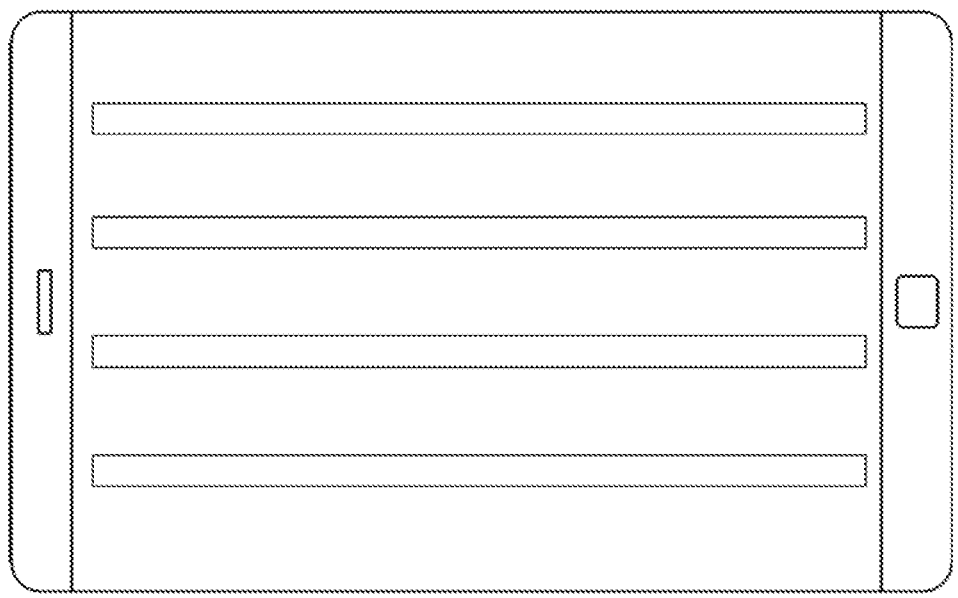

FIG. 12 illustrates an example of a compensation value for compensating pressure intensity in a touch input device including an electrode pattern. FIG. 12(a) illustrates an example of a pattern on the first electrode layer or the second electrode layer which is bent according to a touch input in the touch pressure panel. FIG. 12(b) illustrates an example of a compensation table formed in consideration of a structure of the pattern formed on the first electrode layer or the second electrode layer. In FIG. 12(b), a dotted line shows a position of the pattern. Referring to FIG. 12(b), assuming that an area in which the pattern is located bends less than other areas, a compensation value of 1 is set in the area in which the pattern is located. The compensation value of 1 is also set in an area corresponding to an edge area of the touch panel. A compensation value of 0 is set in other areas of the touch panel.

The pattern formed on the first electrode layer or the second electrode layer may have an insignificant effect on the degree bending. FIG. 12 illustrates an example of the compensation table which takes into consideration the structure included in the touch input device. For example, when a structure which supports the first electrode layer and the second electrode layer is present in other areas in addition to the partition walls on the edge, it is necessary to generate the compensation table in consideration of the corresponding structure.

Figure 13B:
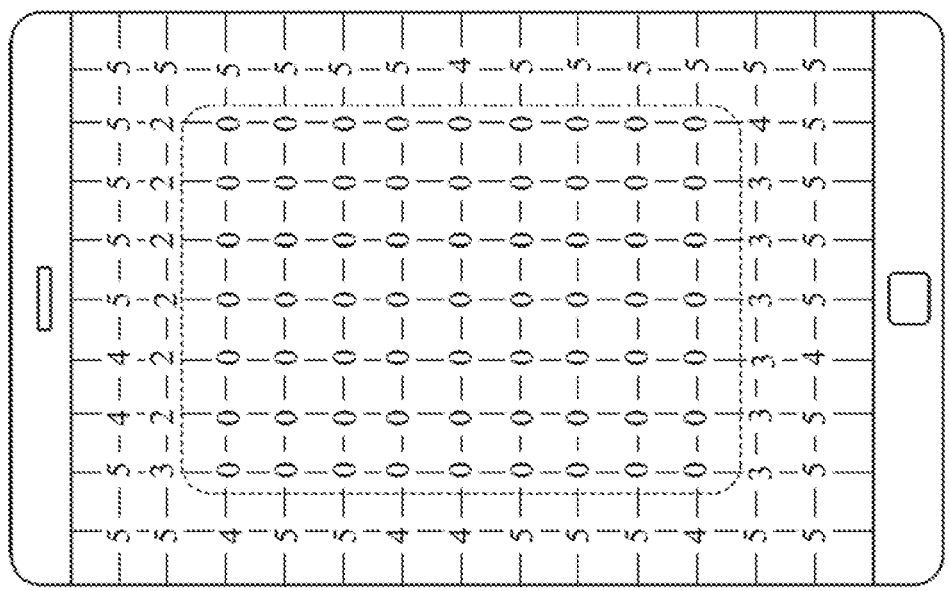
FIG. 13 illustrates a further example of a compensation value for compensating the pressure intensity in a touch input device.
Figure 13A:
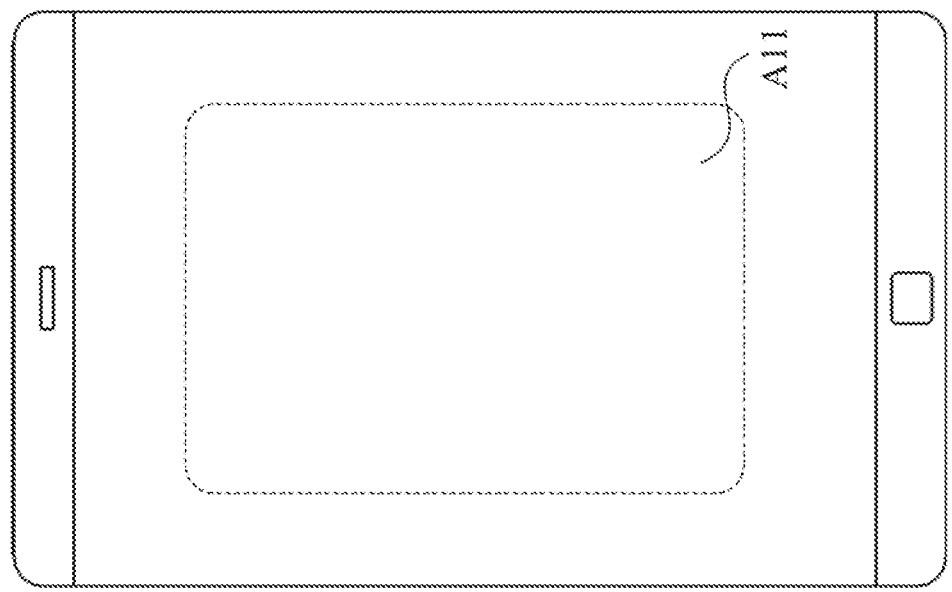

FIG. 13 illustrates a further example of a compensation value for compensating pressure intensity in the touch input device. FIG. 13 corresponds to an example in which a compensation table is provided wherein a manufacturer does not measure a compensation value with respect to a certain central area during a process of manufacturing the touch input device and instead measures a degree of bending of the touch pressure panel in other areas during the manufacturing process. FIG. 13(a) illustrates an example in which the touch panel is divided into a central area A11 and other areas. FIG. 13(b) illustrates an example of a compensation table with respect to the divided areas in FIG. 13(a). Referring to FIG. 13(b), a compensation value of 0 is set with respect to A11, which is the central area in which compensation is not performed. Referring to FIG. 13(b), compensation values of other areas excluding the central area are provided by measuring actual degrees of bending. Referring to FIG. 13(b), it may be seen that edge portions basically have compensation values greater than those of other positions.

Figure 14:
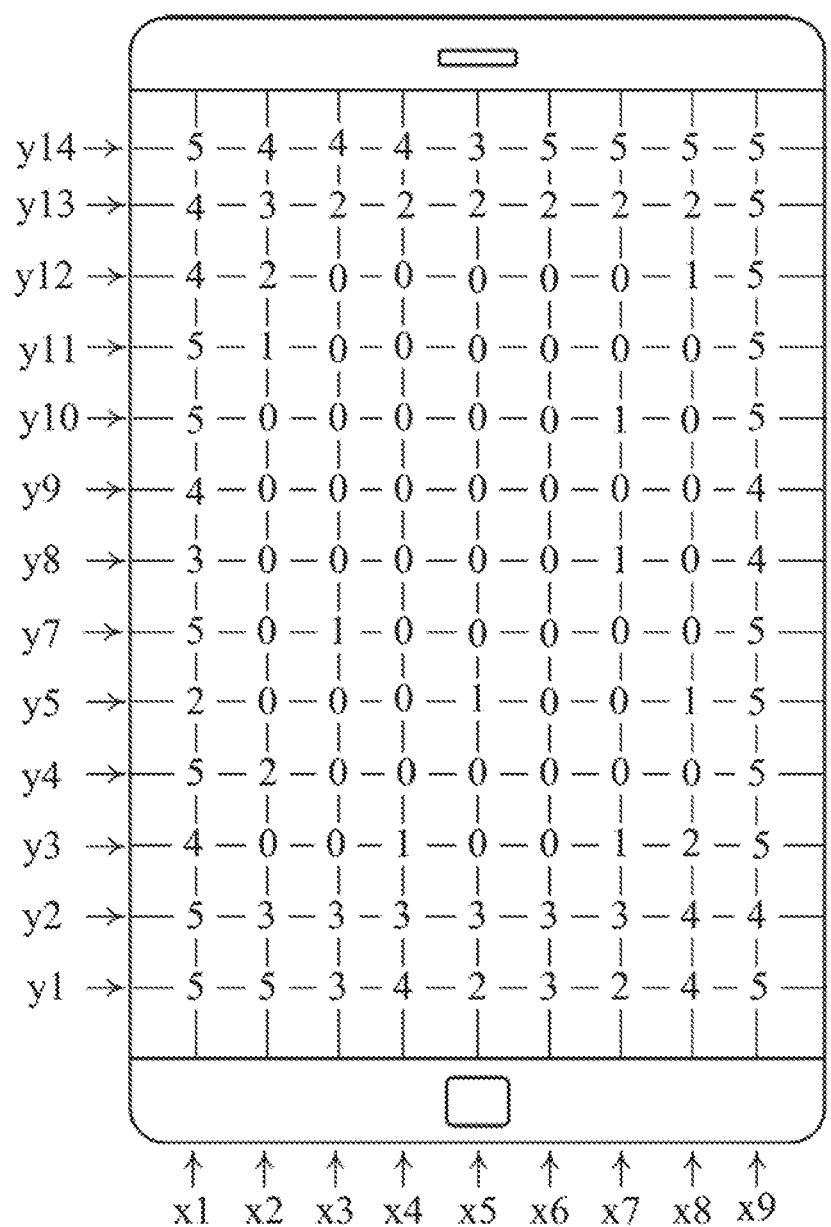
FIG. 14 illustrates a still further example of a compensation value for compensating the pressure intensity in a touch input device.

FIG. 14 illustrates a still further example of a compensation value for compensating the pressure intensity in the touch input device. FIG. 14 illustrates an example in which a compensation table is provided by measuring a degree of bending in every position in which capacitance is measurable during a process of manufacturing the touch input device. Referring to FIG. 14, unlike that shown in FIG. 13, a compensation value is set even in some areas corresponding to the central area of FIG. 13. FIG. 14 additionally illustrates coordinates of a lateral axis x and a longitudinal axis y with respect to the positions in which capacitance is measurable. The touch input device stores and manages a compensation table in which the positions in which capacitance is measurable and compensation values corresponding to the positions are mapped.

The compensation tables have been described with reference to FIGS. 7 to 14. When the touch input device uses a compensation function, the compensation function may be provided in consideration of a touch input position as shown in FIGS. 7 to 14.

Additionally, when the touch input device monitors reference capacitance like the shown in FIG. 6, it is necessary for the touch input device to modify the compensation function when the reference capacitance is changed at a particular position on the touch panel. As described above, the compensation function uses the touch input position as a parameter. When the reference capacitance is changed at the particular position on the touch panel, the touch input device may reflect the change in the compensation function by assigning a weight with respect to the particular position or modifying the weight. When the compensation function is used, the touch input device may store weights corresponding to positions on the touch panel in an additional table.

The touch input device may modify the compensation function when a previously measured reference capacitance differs from a current measured reference capacitance at the particular position on the touch panel. Additionally, the touch input device may measure reference capacitance with respect to a plurality of positions on the touch panel and may modify the compensation function to allow some of the plurality of positions, which have different reference capacitances, to have the same reference capacitance.

The embodiments and the drawings attached to the specification merely describe and illustrate part of the technical concept included in the above-described technology, and it is obvious that both modifications and detailed embodiments easily inferred by those skilled in the art within the range of the technical concept included in the specification and the drawings of the above-described technology are included in the scope of the above-described technology.

The invention claimed is:

1. A method of measuring touch pressure intensity in a touch input device, the method comprising:
with the touch input device:
measuring, at a first time, a first value of reference capacitance of a touch panel of the touch input device in a first state of the touch input device, the first state characterized by absence of a touch input;
measuring, at a second time, a second value of said reference capacitance in a second state of the touch input device, the second state also characterized by absence of the touch input, the first time preceding the second time;
sensing the touch input though the touch panel at a third time, the second time preceding the third time;
determining a touch input position at which the touch input occurred on the touch panel;
measuring a degree of change in capacitance according to the touch input;
compensating the degree of change in capacitance using reference compensation data according to the touch input position to form a compensated degree of change in capacitance,
wherein said compensation data have been updated based on a difference between the first value of reference capacitance and the second value of reference capacitance when said first and second values are not equal to one another, and
wherein said difference represents a change in a degree of bending of the touch input device;
and
measuring pressure intensity according to the touch input on the basis of the compensated degree of change in capacitance.

2. The method of claim 1, wherein said compensating is carried out with the use of a compensation data table containing said compensation data according to respective touch input positions.

3. The method of claim 1, wherein said compensation is carried out with the use of a compensation function utilizing the touch input position as a parameter.

4. The method of claim 1, wherein the compensating including compensating the degree of change in the capacitance such that a touch input applied to an edge area of the touch panel has a greater degree of change in capacitance than that corresponding to a touch input applied to a central area of the touch panel, as defined with respect to the same value of capacitance.

5. The method of claim 1, wherein, for touch inputs applied to different sub-areas of the touch panel of the touch input device and for the same value of capacitance, the compensating includes forming corresponding degrees of change in capacitance that differ from one another.

6. A touch input device configured to sense touch pressure intensity, comprising:
a first electrode layer which comprises a first electrode;
a second electrode layer which comprises a second electrode;
a spacer layer located between the first electrode layer and the second electrode layer; and
a controller circuit configured:
to measure an amount of change in capacitance according to a change in distance between the first electrode layer and the second electrode layer and
to compensate the amount of change in capacitance using updatable compensation data according to a touch input position,
wherein, when a first value of measured reference capacitance is not equal to a second value of previously measured reference capacitance at a particular position on the touch panel, the controller circuit is configured to correct a compensation function or a compensation table containing said updatable compensation data and used for compensating of the amount of change in capacitance according to a difference between the first and second values,
wherein said difference represents a change in a degree of bending of the touch input device;
wherein the first value of measured reference capacitance is a capacitance in a first state of the touch input device characterized by absence of a touch input at a first time;
wherein the second value of reference capacitance is a capacitance in a second state of the touch input device characterized by absence of the touch input at a second time, the second time preceding the first time.

7. The touch input device of claim 6,
further comprising a non-transitory tangible storage memory configured to store a table with data used for compensation of a measured value of said amount of change according to the touch input position, and
wherein the controller circuit is further configured to compensate a degree of change in capacitance according to the touch input position with the use of said table.

8. The touch input device of claim 6, wherein the controller circuit is further configured to compensate the degree of change in the capacitance by employing a compensation function in which the touch input position is used as a parameter.

9. The touch input device of claim 6, wherein the controller circuit is configured to measure reference capacitance, the reference capacitance representing capacitance present in a state without any touch input, and to store a measured value of the reference capacitance in a non-transitory tangible storage memory.

10. A touch input device configured to sense touch pressure intensity, the device comprising:
a first electrode layer formed on a first insulating film and configured to include a first electrode that extends in a direction parallel to the first insulating film;
a metal layer of a conductive metal material that extends in a direction parallel to the first electrode layer;
a spacer layer located between the first electrode layer and the metal layer; and
a controller circuit configured:
to measure an amount of change in capacitance according to a change in a distance between the first electrode layer and the metal layer, and
to compensate the amount of change in the capacitance according to a touch input position based on a difference between a first value of reference capacitance and a second value of reference capacitance, wherein said difference represents a change in a degree of bending of the touch input device,
wherein the controller circuit is configured to measure said first value of reference capacitance as capacitance present at a first time at a particular position in a touch panel of the panel device in a state without any touch input, and to store the first value of the reference capacitance in a non-transitory tangible storage memory;
wherein the controller circuit is configured to measure said second value of reference capacitance as capacitance present at a second time at said particular position in a state without any touch input, the first time preceding the second time; and
wherein the controller circuit is configured:
to correct a compensation function or a compensation data table containing said first value and used for compensating the amount of change in the capacitance based on said difference between the first and second values when the first value is not equal to the second value, and
to store the corrected compensation function or the corrected compensation data table in said non-transitory tangible storage memory.

11. The touch input device of claim 10, further comprising the non-transitory tangible storage memory configured to store said compensation data table containing data used to compensate said amount of change in the capacitance according to the touch input position,
wherein the controller circuit is configured to compensate the amount of change in the capacitance according to the touch input position by using the table.

12. The touch input device of claim 10, wherein the controller circuit is configured to compensate the amount of change in the capacitance by using the compensation function in which the touch input position is used as a parameter.

13. The touch input device of claim 10, wherein the controller circuit is configured to map an area on the touch panel into a plurality of sub-areas and to compensate the amount of change in the capacitance such that, with respect to the same value of the capacitance, amounts of change in capacitance corresponding to a touch input applied to different sub-areas differ from one another.

* * * * *